Dec. 3, 1929.  I. E. QUIST  1,738,447
CABLE GUARD
Filed April 3, 1929  2 Sheets-Sheet 1
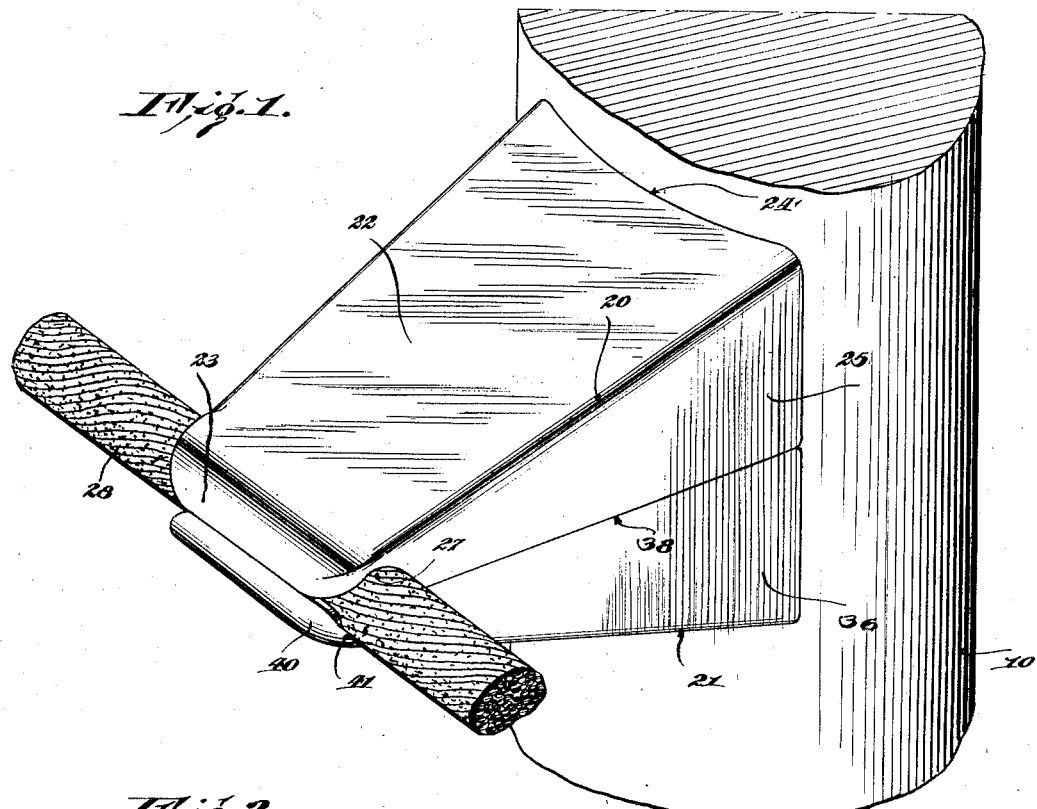
Fig. 1.
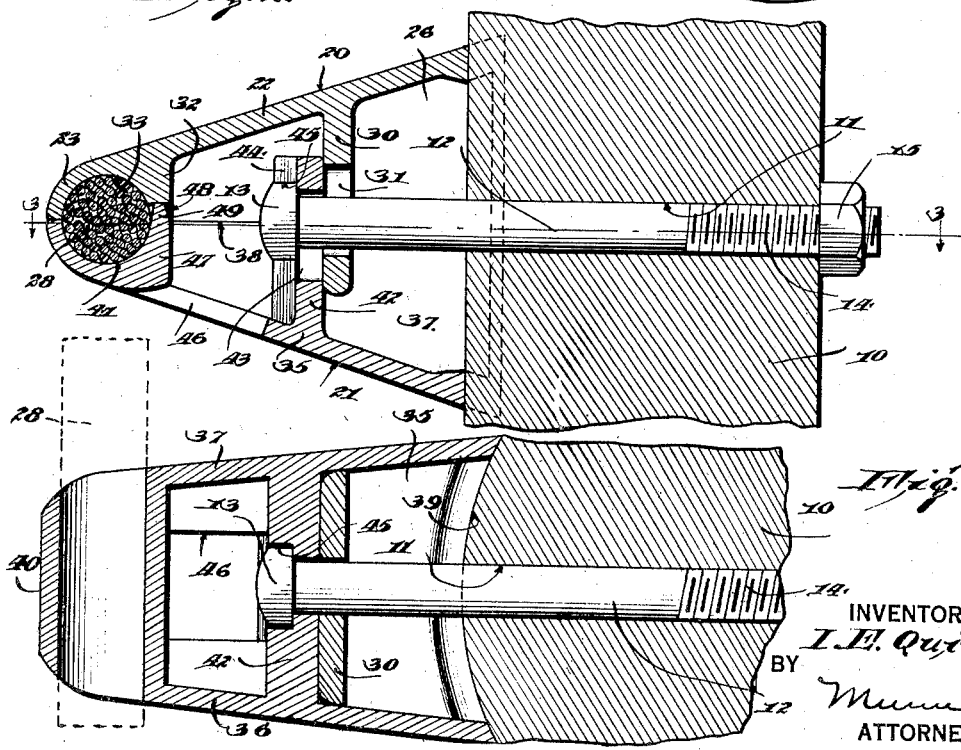
Fig. 2.
Fig. 3.
INVENTOR
I. E. Quist,
BY
ATTORNEY Dec. 3, 1929.  I. E. QUIST  1,738,447
CABLE GUARD
Filed April 3, 1929    2 Sheets-Sheet 2
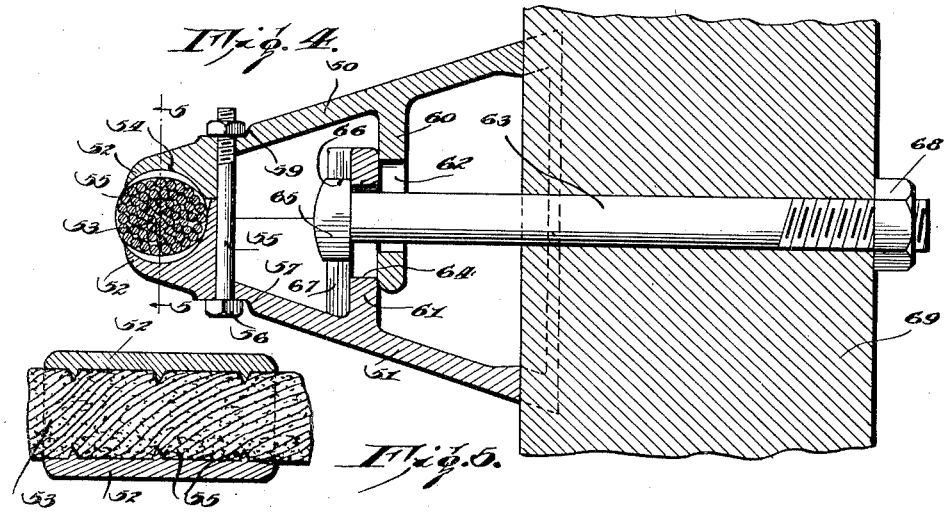
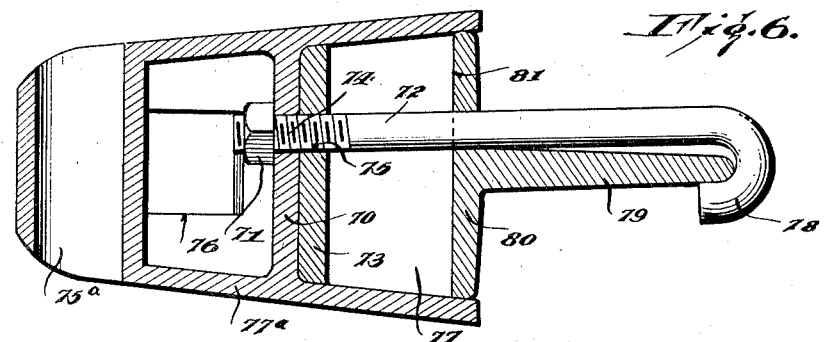
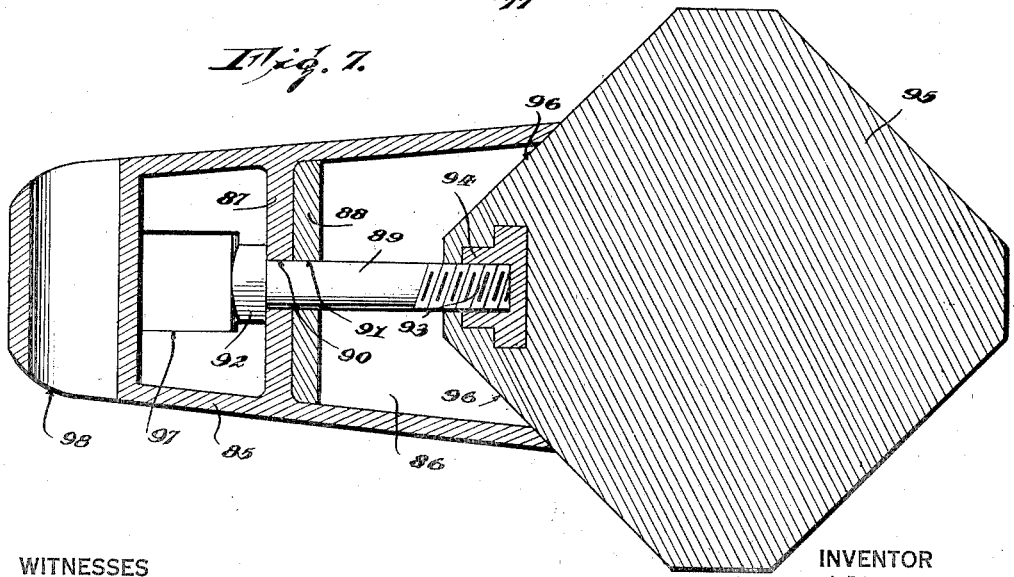
WITNESSES
INVENTOR
I. E. Quist,
BY
ATTORNEY Patented Dec. 3, 1929

1,738,447

UNITED STATES PATENT OFFICE

IRVING E. QUIST, OF WARREN, MINNESOTA

CABLE GUARD

Application filed April 3, 1929. Serial No. 352,231.

This invention relates to cable guards.

An object of the invention is the provision of a cable guard which is adapted to be secured to a post by a simple securing means which also serves to connect a pair of similarly formed sections of the guard together, said sections having slotted flanges adapted to overlap to receive and support the securing means.
A further object of the invention is the provision of a cable guard composed of a plurality of sections having co-operative locking parts and attaching flanges having aligned slots to receive and support a securing means within the body of the guard, the sides of the sections being flat and tapered and provided with seats at their ends to form a slot to receive and support the cable, one of the sections having a window for the insertion of the securing means.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a view in perspective of the cable guard shown attached to a post, Figure 2 is a longitudinal vertical section of the guard and post, Figure 3 is a horizontal section of the guard, Figure 4 is a vertical section of a modified form of the cable guard, Figure 5 is a vertical section taken along the line 5—5 of Figure 4, Figure 6 is a horizontal section of a further modified form of the invention, and Figure 7 is a horizontal section of a still further modified form of the guard.

Referring more particularly to the drawings, 10 designates a post which may be formed of any suitable material for the purpose and is provided with a transverse passage 11 through which is inserted a securing bolt 12 having a head 13 and a threaded portion 14 upon which is screwed a nut 15.

The cable guard is composed of a pair of sections 20 and 21 which are similarly formed and the section 20 consists of a flat plate 22 which is tapered towards its outer end and formed into a curved flange 23. The inner end or bottom of the plate is curved, as shown at 24, to conform to the curvature of the post 10. Projecting laterally from the side edges of the plate 20 are a pair of tapered flanges 25 and 26 which have their upper ends cut to form a curved seat 27 to receive a cable 28.

The section 20 has an intergrally disposed attaching flange 30 extending laterally from the inner face of the plate 22 and is provided with a slot 31 to receive the bolt 12. A second flange 32 extends laterally from the inner face of the plate 22 adjacent its outer end and includes a portion of the arcuately-shaped seat 33 which is adapted to receive the cable 28 of the curved flange 23 of the plate 22.

The section 21 includes a flat plate 35 which is tapered similarly to the tapering of the plate 22 and has laterally disposed flanges 36 and 37 extending from its edges which are tapered and have their free edges abutting the free edges of the flanges 25 and 26 as shown at 38. The inner edge of the plate 35 is curved as shown at 39 to conform to the curvature of the post 10 while the opposite end of the tapered plate merges into a curved flange 40 in which is disposed an arcuately-shaped seat 41 which cooperates with the seat 33 to form a substantially circular passage for the reception of the cable 28.

An attaching flange 42 extends from the inner face of the plate 35 and is provided with a slot 43 adapted to align with a slot 31 for receiving the bolt 12. The head 13 of the bolt rests upon this flange. The flange has a raised portion 44 embracing the head 13 to form a seat 45 for said head and the seat is of such a shape that it will maintain the head and bolt 12 against rotation when the nut 15 is threaded onto said bolt.

The plate 35 has a window 46 adjacent the flange 42 and through which is adapted to be inserted the bolt 12. A second flange 47 is located adjacent the flange 32 and is formed integrally with the outer end of the plate 35 and includes a portion of the curved seat 41 which receives the cable 28.

The flange 32 is provided with a notch 48 to receive a lug 49 projecting from the flange 47 of the plate 33.

The cable guard shown in Figures 1 to 3, inclusive, is assembled as follows: The two sections 20 and 21 are fitted loosely together so that the lug 49 will seat within the notch 48 and flange 42 overlap the flange 30 so that the slots 31 and 43 will align. The bolt 12 is inserted through the window 46 and through the elongated slots 31 and 43 until the head 13 rests within the seat 45 on the flange 42. The bolt 12 is then inserted in the passage 11 in the post 10 until the curved portions 42 and 39 engage the post 10. The nut 15 is threaded onto the outer end of the bolt 12 while the head 13 of the bolt is being maintained against rotation by the shoulders of the seat 45 on the flange 42. When the nut has been drawn up tight on the bolt, the cable guard will be locked in place.

It will be appreciated, however, that the cable 28 is inserted between the sections 20 and 21 and received by the curved seats 33 and 41 before the nut 15 is screwed up tight upon the post 10. By this construction the sections of the cable guard are not only securely fastened together but they are attached to the post 10 by the single bolt 12 and the nut 15.

Referring more particularly to Figures 4 to 7, inclusive, it will be seen that several modified forms are disclosed which are formed upon the same principle as the cable guard illustrated in Figures 1 to 3, inclusive. However, a slight modification of the method of securing the cable guard to a post is illustrated together with additional means for clamping the outer ends of the sections onto the cable for rigidly holding the cable against slippage within the guard.

In Figure 4 the sections are identical with those shown in Figure 1 except that the outer extreme ends of the plates 50 and 51 terminate as shown at 52 to provide a space between the curved edges and through which the cable 53 partly projects. The inner faces of the curved seats 54 are provided with ribs 55 which are adapted to frictionally grip the cable.

A bolt 55 passes through perforations in the plates 50 and 51 and has a head 56 resting in a seat 57 in the plate 51 while a nut 58 resting in a seat 59 is threaded on the outer end of the bolt for forcing the clamping jaws into rigid relation with the cable 53.

The plates 50 and 51 are provided with overlapping flanges as shown at 60 and 61. The flange 60 has an elongated slot 62 to receive a bolt 63 while the flange 61 has a slot 64 likewise receiving the bolt. The bolt has a head 65 normally seated within a pocket 66 formed by the raising of the metal as shown at 67 of the flange 61. A nut 68 is threaded onto the bolt 63 and is adapted to clamp the sections of the plates 50 and 51 together and for clamping the sections to the post 69.

The construction shown in Figure 6 is similar to that illustrated in Figures 1 and 3, inclusive, except that the plate 70 is flat and a nut 71 threaded onto the inner end of a bolt 72 rests upon the outer face of the flange 70. This flange overlaps the flange 73. The flange 70 has a slot 74 while the flange 73 has a slot 75 adapted to receive the inner end of the bolt 72.

A curved jaw 75$^a$ co-operates with a similarly formed jaw on the second section of the cable guard for receiving and supporting a cable. A window 76 is formed in one plate 77 of a section through which is adapted to be inserted the nut 71.

The bolt is provided at its outer end with a hook 78 which engages over a flange 79 upon a T-shaped post 80. Each plate of the section is cut away as shown at 81 to receive one face of the T-shaped post 80 so that when the nut 71 is drawn up tight on the flange 70 the sections of the cable guard will be clamped to the post.

A modified form of the guard is shown in Figure 7 in which two sections 85 and 86 are employed and adapted to be interfitted together with the flanges 87 and 88 respectively of said sections located in overlapping relation when a bolt 89 is inserted through passages 90 and 91, respectively, of the sections 85 and 86. This bolt has a head 92 resting upon the flange 87 and has its inner end as shown at 93 threaded into a flange socket 94 imbedded in a concrete post 95. The sections of the cable guard are cut away at an angle, as shown at 96, to fit the post 95. A window 97 is formed in the sections 86 to permit the ready insertion of the bolt 89.

At the outer end of each section is provided a jaw 98 adapted to receive a cable when the sections are fitted together for clamping the cable in position.

I claim:

1. A cable guard comprising a pair of interfitting sections, each section including a plate having lateral flanges at the edges thereof, a slotted attaching flange projecting from the inner face of each plate and intermediate the ends of the plates, the attaching flanges being adapted to overlap with the slots alining when the sections are fitted together, a securing bolt passing through the alined slots and having means engaging an attaching flange for securing the sections together and for drawing the inner ends of the plates in rigid relation with a fixed support, and co-operating means on the outer ends of the sections for receiving and supporting a cable.

2. A cable guard comprising a pair of interfitting sections, each section including a plate having lateral flanges at the edges thereof, a slotted attaching flange projecting from the inner face of each plate, the attaching flanges being adapted to overlap with the slots alining when the sections are fitted together, a securing bolt passing through the aligned slots and having means engaging an attaching flange for securing the sections together and for forcing the inner ends of the plates in rigid relation with a fixed support, and co-operating means on the outer ends of the sections for receiving and supporting a cable, the edges of the lateral flanges being adapted to abut when the sections are interfitted.

3. A cable guard comprising a pair of interfitting sections, each section including a plate having lateral flanges at the edges thereof, a slotted attaching flange projecting from the inner face of each plate, the attaching flanges being adapted to overlap with the slots alining when the sections are fitted together, a securing bolt passing through the alined slots and having means engaging an attaching flange for securing the sections together and for forcing the inner ends of the plates in rigid relation with a fixed support, said plates being tapered, the reduced portion of the tapered plate being curved at the free ends, the reduced portions of the plate being cut away interiorly to provide a seat for the reception of a cable.

4. A cable guard comprising a pair of interfitting sections, each section including a plate having lateral flanges at the edges thereof, a slotted attaching flange projecting from the inner face of each plate and located intermediate the ends of the plates, the attaching flange being adapted to overlap with the slots alining when the sections are fitted together, a securing bolt passing through the alined slots and having means engaging an attaching flange for securing the sections together and for forcing the inner ends of the plates in rigid relation with a fixed support, said plates being tapered, the reduced portion of the tapered plate being cut away interiorly to provide a seat for the reception of a cable, said seats being provided with ribs to engage the cable.

5. A cable guard comprising a pair of interfitting sections, each section including a plate having lateral flanges at the edges thereof, a slotted attaching flange projecting from the inner face of each plate and located intermediate the ends of the plate, the attaching flange being adapted to overlap with the slots alining when the sections are fitted together, a securing bolt passing through the alined slots and having means engaging an attaching flange for securing the sections together and for forcing the inner ends of the plates in rigid relation with a fixed support, said plates being tapered, the reduced portion of the tapered plate being cut away interiorly to provide a seat for the reception of a cable, said seats being provided with ribs, and means for causing the ribs to rigidly clamp against the cable.

6. A cable guard comprising a pair of interfitting sections, each section including a plate having lateral flanges at the edges thereof, a slotted attaching flange projecting from the inner face of each plate, the attaching flanges being adapted to overlap with the slots alining when the sections are fitted together, a securing bolt passing through the alined slots and having means engaging an attaching flange for securing the sections together and for forcing the inner ends of the plates in rigid relation with a fixed support, said plates being tapered, the reduced portion of the tapered plate being curved at the free ends, the reduced portions of the plate being cut away interiorly to provide a seat for the reception of a cable, the free ends of the plates when curved to form the seat being spaced from each other so that the free ends will bite into the cable.

IRVING E. QUIST.